US007326740B2

(12) United States Patent
Stadler et al.

(10) Patent No.: US 7,326,740 B2
(45) Date of Patent: Feb. 5, 2008

(54) NATURAL PRODUCTS COMPOSITES

(75) Inventors: Urs Stadler, Madison, NJ (US); Gerry Capocci, Greenwich, CT (US); Shing Li, Danbury, CT (US); Melinda Reyes, Morris Plains, NJ (US); Heinz Herbst, Lörrach (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 637 days.

(21) Appl. No.: 10/827,789

(22) Filed: Apr. 20, 2004

(65) Prior Publication Data

US 2004/0235983 A1 Nov. 25, 2004

Related U.S. Application Data

(60) Provisional application No. 60/464,797, filed on Apr. 23, 2003.

(51) Int. Cl.

| | |
|---|---|
| ***C09D 5/16*** | (2006.01) |
| ***C08K 5/34*** | (2006.01) |
| ***C08K 5/3492*** | (2006.01) |
| ***C08K 3/00*** | (2006.01) |
| ***C08K 3/22*** | (2006.01) |
| ***C08L 5/00*** | (2006.01) |
| ***C08L 97/02*** | (2006.01) |

(52) U.S. Cl. ............................ 523/122; 524/9; 524/13; 524/15; 524/56; 524/91; 524/100; 524/101; 524/102; 524/238; 524/287; 524/316; 524/359; 524/430; 524/432; 524/433; 524/437; 524/438; 524/442

(58) Field of Classification Search ................ 523/122; 524/9, 13, 15, 56, 91, 100, 101, 102, 238, 524/287, 316, 359, 430, 432, 433, 437, 438, 524/442

See application file for complete search history.

(56) References Cited

U.S. PATENT DOCUMENTS

| | | | | |
|---|---|---|---|---|
| 4,292,430 | A | 9/1981 | Rokach et al. .............. | 548/206 |
| 6,290,885 | B1 | 9/2001 | Roetheli et al. ............ | 264/108 |
| 6,323,224 | B1 | 11/2001 | Tsuboi et al. ............... | 514/341 |
| 6,527,981 | B1 | 3/2003 | Tseng et al. ................ | 252/384 |
| 6,585,989 | B2 | 7/2003 | Herbst et al. ............... | 424/404 |
| 2001/0027217 | A1 | 10/2001 | Jaetsch et al. .............. | 514/731 |
| 2002/0051892 | A1 | 5/2002 | Laks et al. .................. | 428/541 |
| 2002/0106413 | A1* | 8/2002 | Herbst et al. ............... | 424/600 |

OTHER PUBLICATIONS

Chemical Abstract 132:65270 for JP 2000017773 (Dec. 2000).
Patent Abstracts of Japan Publication No. 06143205 (Dec. 1994).
Chemcial Abstract 132:330882 for JP 2000136105 (Dec. 2000).
Chemical Abstract 99:124256 for Mokuzai Kenkyu Shiryo, vol. 17, pp. 122-131, (Dec. 1983).

* cited by examiner

*Primary Examiner*—Kriellion A Sanders
(74) *Attorney, Agent, or Firm*—Tyler A. Stevenson

(57) ABSTRACT

Disclosed are natural products composites protected against the deleterious effects of microorganisms comprising at least one natural product, at least one thermoplastic resin, and an effective amount of an antifungal agent. The composites are further advantageously protected against weathering and color formation by the incorporation therein of at least one light stabilizer and at least one compound selected from the group consisting of the oxides, hydroxides or silicates of Ca, Mg, Al and Zn. The light stabilizers are selected from the group consisting of the ultraviolet light absorbers and the sterically hindered amines. The metal oxide is for example CaO. The natural products are for example wood flour, flax, hemp, jute, kenaf, or rice husk. The thermoplastic resin is for example polyethylene or polypropylene. The antifungal agent and potential coadditives are incorporated via melt processing such as extrusion, co-kneading, pultrusion and injection molding. The antifungal agent is for example thiabendazole.

39 Claims, No Drawings

NATURAL PRODUCTS COMPOSITES

This application claims the benefit under 35 USC 119(e) of U.S. provisional app. No. 60/464,797, filed Apr. 23, 2003.

Natural products composites, for example wood/plastic composites, are effectively protected from microorganisms by the incorporation therein of an antifungal agent via melt extrusion. Further inclusion of light stabilizers and/or certain antistaining additives effectively protects the composites against the deleterious effects of light, heat, oxygen, moisture and chemical interactions.

The protection of wood and wood composites from microorganisms is known.

U.S. Pat. No. 6,323,224 teaches the use of known nitromethylene or nitroimino compounds as agents for combating technical materials destroying insects. The co-use of fungicides, bacteriocides and algicides is also disclosed.

U.S. Pat. No. 6,527,981 discloses the co-use of azoles and amine oxides as broad spectrum fungicidal wood preservatives.

JP2000017773 teaches insect resistant plastic wood.

JP06143205 teaches the manufacture of mildew resistant wood plastic composites.

JP2000136105 discloses wood that is protected against insect infestation.

U.S. published app. No. 2001/0027217 discloses adhesive formulations for wood or wood composite plies that contain phenolic comounds and other anti insect, anti basidiomycetes, anti termite and anti fungal agents.

Mokuzai Kenkyu Shiryo (1983), 17, 122-31 discloses chemical control to prevent sapstain and mold on rubber wood.

U.S. Pat. No. 6,290,885 discloses natural products composites.

Natural products composites change to a silver gray appearance within a very short time (typically a few weeks) upon exposure to sunlight and weather. In addition, dark stains may appear through chemical interaction (tannin interaction with metals) and/or fungal growth. Repeated surface treatment with specific coatings and/or cleaning with different chemicals is necessary to address these issues.

Chemical interaction is for example tannin interaction with a metal source (iron nails) and results in unwanted staining. Microorganism growth also results in unwanted staining. The effects of microorganism growth, weather (heat, light, moisture and oxygen) and chemical interaction all result in unwanted color change.

Surprisingly, it has been found that antifungal agents are especially effective in natural products composites when incorporated therein via melt extrusion. The combination of thiabendazole, at least one compound selected from the group consisting of the light stabilizers, and/or at least one compound selected from the group consisting of oxides, hydroxides or silicates of Ca, Mg, Al and Zn are especially effective systems for the protection of natural products composites against the deleterious effects of microorganisms, weathering and chemical interactions.

The incorporation of the present protective systems into natural products composites via melt extrusion provides a long term effect towards improving weathering resistance and color stability. This provides maintainence free products with a cost efficient approach.

DETAILED DISCLOSURE

Disclosed is a process for the preparation of natural products composites that are resistant to color change due to microorganism growth, weathering and chemical interaction, which process comprises combining into a mixture at least one natural product, at least one thermoplastic resin, an effective amount of an antifungal agent, and melt processing the mixture.

Also disclosed is a process for the preparation of natural products composites that are resistant to color change due to microorganism growth, weathering and chemical interaction, which process comprises combining into a mixture at least one natural product, at least one thermoplastic resin, an effective amount of an antifungal agent, and at least one compound selected from the group consisting of the light stabilizers, and melt processing the mixture.

Also disclosed is process for the preparation of natural products composites that are resistant to color change due to microorganism growth, weathering and chemical interaction, which process comprises combining into a mixture at least one natural product, at least one thermoplastic resin, an effective amount of an antifungal agent, and at least one compound selected from the group consisting of the oxides, hydroxides or silicates of Ca, Mg, Al and Zn, and melt processing the mixture.

Also disclosed is process for the preparation of natural products composites that are resistant to color change due to microorganism growth, weathering and chemical interaction, which process comprises combining into a mixture at least one natural product, at least one thermoplastic resin, an effective amount of an antifungal agent, and at least one compound selected from the group consisting of the light stabilizers, and at least one compound selected from the group consisting of the oxides, hydroxides or silicates of Ca, Mg, Al and Zn, and melt processing the mixture.

The antifungal agent is for example those disclosed in U.S. published app. No. 2001/0027217 and U.S. Pat. Nos. 6,323,224 and 6,527,981, the relevant disclosures of which are hereby incorporated by reference.

The antifungal agents are for example benzimidazoles, halogenated phenols, substituted triazines, isothioazolinones, isothiazoles, oxybisphenoxyarsines, thiabendazoles and/or inorganic compounds (materials containing copper, silver, tin, zinc, etc.).

The antifungal agent is for example selected from the group consisting of thiabendazole, salts of thiabendazole (e.g. with hypophospohoric acid), carbendazole, 10,10' oxybisphenoxyarsine, tebuconazole, tolnaftate, zinc bis-(2-pyridinethiol-1-oxide), 2n-octyl-4-isothiazolin-3-one, 4,5-dichloro-octyl-4-isothiazoline, N-butyl-1,2-benzisothiazolin-3-one and mixtures thereof.

A halogenated phenol is for example 2,4,4'-trichloro-2'-hydroxydiphenyl ether.

Halogenated phenols and inorganic compounds are disclosed for example in U.S. patent application Ser. No. 09/957,959, filed Sep. 21, 2001, the relevant disclosures of which are hereby incorporated by reference.

Thiabendazole, and thiabendazole further in combination with at least one light stabilizer and/or at least one compound selected from the group consisting of the oxides, hydroxides or silicates of Ca, Mg, Al and Zn, are especially effective systems towards protecting natural products composites against microorganisms and weathering. The present additive systems are especially effective at protecting natural products composites against staining that is the result of the growth of microorganisms, weathering (light, heat, oxygen and moisture) and chemical interaction.

Thiabendazole is 2-(4-thiazolyl)benzimidazole, CAS #148-79-8.

Thiabendazole is effective for example against effective for example against *alternaria* spp, *aspergillus* spp such as *aspergillus niger, aspergillus repens* and *asperfillus flavus; aureobasidium pullulans, botrytis* spp, *chaetomonium globosum, cladosporium herbarum, fusarium* spp, *penicillium* spp, *stachybotrys* spp, *ventriculum* spp, and the like The antifungal agent is present in the composites of the present invention for example, at a level of from about 0.05% to about 3% by weight, based on the weight of the entire mixture. For example, the antifungal agent is present at a level of from about 0.05% to about 1.0% by weight, based on the weight of the entire mixture. For example the antifungal agent is present from about 0.1% to about 0.8%, from about 0.2% to about 0.6% or from about 0.3% to about 0.5% by weight, based on the weight of the mixture. For example, the antifungal agent is present from about 0.05% to about 0.5%, from about 0.05% to about 0.6%, or from about 0.05% to about 0.8% by weight. For instance, the antifungal agent is present from about 0.1% to 1.0%, from about 0.2% to about 1.0%, or from about 0.3% to about 1.0% by weight.

The light stabilizers are selected from the group consisting of the ultraviolet light absorbers (UVA's) and sterically hindered amine light stabilizers (HALS).

The ultraviolet light absorbers are for example selected from the group consisting of the 2H-benzotriazoles, benzophenones, benzoic acid esters, acrylates, malonates, oxamides, salicylates, benzoxazin-4-ones and s-triazines.

The 2H-benzotriazoles, or 2-(2-hydroxyphenyl)-2H-benzotriazoles, are for example those as disclosed in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905, 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218, the disclosures of which are hereby incorporated by reference, such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

The benzophenones, or 2-hydroxybenzophenones, are for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Esters of substituted and unsubstituted benzoic acids are for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Acrylates and malonates are for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, Sanduvor® PR25, dimethyl p-methoxybenzylidenemalonate (CAS# 7443-25-6), and Sanduvor® PR31, di-(1,2,2,6,6-pentamethylpiperidin-4-yl) p-methoxybenzylidenemalonate (CAS #147783-69-5).

Oxamides are for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'- ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

A benzoxazinone UV absorber is for example 2,2'-p-phenylene-bis(3,1-benzoxazin-4-one), Cyasorb® 3638 (CAS# 18600-59-4).

The s-triazines, or tris-aryl-o-hydroxyphenyl-s-triazines, for example known commercial s-triazines, are for example as disclosed in U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,736,597; 5,942,626; 5,959,008; 5,998,116; 6,013,704; 6,060,543; 6,187,919; 6,242,598 and 6,468,958, the disclosures of which are hereby incorporated by reference, for example 4,6-bis-(2,4-dimethylphenyl)-2-(2-hydroxy-4-octyloxyphenyl)-s-triazine, Cyasorb® 1164, Cytec Corp, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxyethoxy)phenyl]-6-(4-chlorophenyl)-s-triazine, 2,4-bis[2-hydroxy-4-(2-hydroxy-4-(2-hydroxyethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)-phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine, 2,4-bis(2,4-dimethylphenyl)-6-[2-hydroxy-4-(3-benzyloxy-2-hydroxypropyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonylisopropylideneoxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl]-s-triazine, mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, Tinuvin® 400, Ciba Specialty Chemicals Corp., 4,6-bis-(2,4-dimethylphenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

In particular, the ultraviolet light absorbers (UVA's) are selected from the group consisting of the 2H-benzotriazoles, the benzophenones and the s-triazines.

For example, the present ultraviolet light absorbers are selected from the group consisting of 2-(2-hydroxy-5-methylphenyl)-2H-benzotriazole;
2-(2-hydroxy-5-tert-octylphenyl)-2H-benzotriazole;
2-(2-hydroxy-3,5-di-tert-amylphenyl)-2H-benzotriazole;
octyl 3-(benzotriazol-2-yl)-5-tert-butyl-4-hydroxyhydrocinnamate;
2-(2-hydroxy-3,5-di-tert-butylphenyl)-2H-benzotriazole;
2-(2-hydroxy-5-tert-butylphenyl)-2H-benzotriazole;
2-(2-hydroxy-3,5-di-tert-butylphenyl)-2H-benzotriazole;
2-(2-hydroxy-3-tert-butyl-5-methylphenyl)-2H-benzotriazole;
2-(2-hydroxy-3-sec-butyl-5-tert-butylphenyl)-2H-benzotriazole;
2-(2-hydroxy-4-octyloxyphenyl)-2H-benzotriazole;
2-(2-hydroxy-3-dodecyl-5-methylphenyl)-2H-benzotriazole;
2-[2-hydroxy-3,5-di(α,α-dimethylbenzyl)phenyl]-2H-benzotriazole;
2-[2-hydroxy-3-(α,α-dimethylbenzyl)-5-tert-octylphenyl]-2H-benzotriazole;
2-{2-hydroxy-3-tert-butyl-5-[2-(omega-hydroxy-octa(ethyleneoxy)carbonyl)ethyl]phenyl}-2H-benzotriazole;
2-{2-hydroxy-3-tert-butyl-5-[2-(octyloxy)carbonyl)ethyl]phenyl}-2H-benzotriazole;
5-trifluoromethyl-2-(2-hydroxy-3-α-cumyl-5-t-octylphenyl)-2H-benzotriazole;
5-chloro-2-(3,5-di-t-butyl-2-hydroxyphenyl)-2H-benzotriazole;
2-(3-t-butyl-2-hydroxy-5-(2-octyloxycarbonylethyl)phenyl)-5-chloro-2H-benzotriazole;
4-octyloxy-2-hydroxybenzophenone;
4-methoxy-2-hydroxybenzophenone;
4-methoxy-2,2'-dihydroxybenzophenone;
4,4'dimethoxy-2,2'-dihydroxybenzophenone;
2,4-bis[2-hydroxy-4-(3-butyloxy-2-hydroxypropoxy)phenyl]-6-mesityl-s-triazine;
2,4-bis(2,4-dimethylphenyl)-6-(2-hydroxy-4-octyloxyphenyl)-s-triazine, CYASORB® 1164, Cytec;
2,4-diphenyl-6-(2-hydroxy-4-hexyloxyphenyl)-s-triazine;
2,4-bis(2,4-dimethylphenyl)-6-[2-hydroxy-4-(3-do-/tri-decyloxy-2-hydroxypropoxy)-phenyl]-s-triazine;
2,4-bis(2,4-dimethylphenyl)-6-[2-hydroxy-4-(3-do-/tri-decyloxy-2-hydroxypropoxy)-5-α-cumylphenyl]-s-triazine;
reaction product of 2,4,6-tris(2,4-dihydroxyphenyl)-s-triazine with isooctyl α-halopropionate;
2-(2,4-dibutyloxyphenyl)-4,6-bis(2-hydroxy-4-butyloxyphenyl)-s-triazine;
2,4-bis(4-biphenylyl)-6-(2-hydroxy-4-octyloxycarbonylethylideneoxyphenyl)-s-triazine;
2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine;
2,4-bis(2,4-dimethylphenyl)-6-[2-hydroxy-4-(3-benzyloxy-2-hydroxypropyloxy)phenyl]-s-triazine;
2,4-bis(2-hydroxy-4-butyloxyphenyl)-6-(2,4-di-butyloxyphenyl)-s-triazine;
2,4-bis(2,4-dimethylphenyl)-6-[2-hydroxy-4-(3-nonyloxy*-2-hydroxypropyloxy)-5-α-cumyl-phenyl]-s-triazine; (* denotes a mixture of octyloxy, nonyloxy and decyloxy groups)

methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio;

2,4,6-tris(2-hydroxy-4-isooctyloxycarbonylisopropylideneoxyphenyl)-s-triazine;

2,4-bis(2,4-dimethylphenyl)-6-(2-hydroxy-4-hexyloxy-5-α-cumylphenyl)-s-triazine; and 2,4,6-tris[2-hydroxy-4-(3-sec-butyloxy-2-hydroxypropyloxy)phenyl]-s-triazine.

In another embodiment of the instant invention, the ultraviolet light absorbers are selected from the group consisting of 2-(2-hydroxy-5-tert-octylphenyl)-2H-benzotriazole;

2-[2-hydroxy-3-(α,α-dimethylbenzyl)-5-tert-octylphenyl]-2H-benzotriazole;

2-{2-hydroxy-3-tert-butyl-5-[2-(omega-hydroxy-octa(ethyleneoxy)carbonyl)ethyl]phenyl}-2H-benzotriazole;

2-{2-hydroxy-3-tert-butyl-5-[2-(octyloxy)carbonyl)ethyl]phenyl}-2H-benzotriazole;

4-octyloxy-2-hydroxybenzophenone;

4-methoxy-2-hydroxybenzophenone;

2,4-bis[2-hydroxy-4-(3-butyloxy-2-hydroxypropoxy)phenyl]-6-mesityl-s-triazine;

reaction product of 2,4,6-tris(2,4-dihydroxyphenyl)-s-triazine with isooctyl α-halopropionate;

2,4-bis(4-biphenylyl)-6-(2-hydroxy-4-octyloxycarbonylethylideneoxyphenyl)-s-triazine;

2,4-bis(2,4-dimethylphenyl)-6-[2-hydroxy-4-(3-nonyloxy*-2-hydroxypropyloxy)-5-α-cumyl-phenyl]-s-triazine; (* denotes a mixture of octyloxy, nonyloxy and decyloxy groups) and 2,4,6-tris(2-hydroxy-4-isooctyloxycarbonylisopropylideneoxyphenyl)-s-triazine.

The present hindered amines are for example monomeric compounds or are oligomeric or polymeric compounds.

The present sterically hindered amines are for example N—H, N—OH, N-alkyl, N-alkoxy, N-cycloalkoxy, N-acyl, N-acyloxy, N-aralkoxy, N-aryloxy, N-hydroxyalkoxy or N-hydroxycycloalkoxy hindered amines.

The present sterically hindered amines are for example tetramethyl-piperidine based.

Alkyl is straight or branched and is for example methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl.

Cycloalkyl groups include cyclopentyl and cyclohexyl; typical aralkyl groups include benzyl, alpha-methyl-benzyl, alpha,alpha-dimethylbenzyl or phenethyl.

Hindered amine stabilizers are well known in the art. They are disclosed for example in U.S. Pat. Nos. 5,004,770, 5,204,473, 5,096,950, 5,300,544, 5,112,890, 5,124,378, 5,145,893, 5,216,156, 5,844,026, 6,117,995, 6,271,377, 6,392,041, 6,376,584, 6,472,456, and U.S. patent application Ser. Nos. 60/312,517, filed Aug. 15, 2001 and Ser. No. 09/714,717, filed Nov. 16, 2000. The relevant disclosures of these patents and applications are hereby incorporated by reference.

U.S. Pat. Nos. 6,271,377, 6,392,041 and 6,376,584 disclose hindered hydroxyalkoxyamine and hydroxycycloalkoxyamine stabilizers. Hindered hydroxyalkoxyamine stabilizers are also known as N-hydroxyalkoxy hindered amines, or NORol HALS. These references are incorporated by reference.

The present sterically hindered amine stabilizers, are for example 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl-4-piperidyl)-hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-amino-propylamino) ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane and epichlorohydrin, 1,1-bis(1,2,2,6,6-pentamethyl-4-piperidyloxycarbonyl)-2-(4-methoxyphenyl) ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

The sterically hindered amine may also be one of the compounds described in U.S. Pat. No. 5,980,783, the relevant parts of which are hereby incorporated by reference, that is compounds of component I-a), I-b), I-c), I-d), I-e), I-f), I-g), I-h), I-i), I-j), I-k) or I-l), in particular the light stabilizer 1-a-1, 1-a-2, 1-b-1, 1-c-1, 1-c-2, 1-d-1, 1-d-2, 1-d-3, 1-e-1, 1-f-1, 1-g-1, 1-g-2 or 1-k-1 listed on columns 64-72 of said U.S. Pat. No. 5,980,783.

The sterically hindered amine may also be one of the compounds described in U.S. Pat. Nos. 6,046,304 and 6,297,299, the disclosures of which are hereby incorporated by reference, for example compounds as described in claims 10 or 38 or in Examples 1-12 or D-1 to D-5 therein.

The present sterically hindered amines may also be those substituted on the N-atom by a hydroxy-substituted alkoxy group, for example compounds such as 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, the reaction product of 1-oxyl-4-hydroxy-2,2,6,6-tetramethylpiperidine with a carbon radical from t-amylalcohol, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl)sebacate, bis(1-(2-hydroxy-2-methylpropoxy)-2,2,6,6-tetramethyl-piperidin-4-yl)adipate, bis(1-(2-hydroxy-2-methylpropoxy)-2,2,6,6-tetramethylpiperidin-4-yl)succinate, bis(1-(2-hydroxy-2-methylpropoxy)-2,2,6,6-tetramethylpiperidin-4-yl)glutarate or 2,4-bis{N-[1-(2-hydroxy-2-methylpropoxy)-2,2,6,6-tetramethylpiperidin-4-yl]-N-butylamino}-6-(2-hydroxyethylamino)-s-triazine.

Suitable hindered amines according to the present invention include for example:

bis(2,2,6,6-tetramethylpiperidin-4-yl)sebacate;

bis(1,2,2,6,6-pentamethylpiperidin-4-yl)sebacate;

di(1,2,2,6,6-pentamethylpiperidin-4-yl) (3,5-di-tert-butyl-4-hydroxybenzyl)butylmalonate;

4-benzoyloxy-2,2,6,6-tetramethylpiperidine;

4-stearyloxy-2,2,6,6-tetramethylpiperidine;

tris(2,2,6,6-tetramethylpiperidin-4-yl)nitrilotriacetate;

polycondensation product of 2,4-dichloro-6-tert-octylamino-s-triazine and 4,4'-hexamethylenebis(amino-2,2,6,6-tetramethylpiperidine);

polycondensation product of 1-(2-hydroxyethyl)-2,2,6,6-tetramethyl-4-hydroxypiperidine and succinic acid;

polycondensation product of 4,4'-hexamethylenebis-(amino-2,2,6,6-tetramethylpiperidine) and 1,2-dibromoethane;

tetrakis(2,2,6,6-tetramethylpiperidin-4-yl) 1,2,3,4-butanetetracarboxylate;

tetrakis(1,2,2,6,6-pentamethylpiperidin-4-yl) 1,2,3,4-butanetetracarboxylate;

polycondensation product of 2,4-dichloro-6-morpholino-s-triazine and 4,4'-hexamethylenebis(amino-2,2,6,6-tetramethylpiperidine);

N,N', N",N'"-tetrakis[(4,6-bis(butyl-1,2,2,6,6-pentamethylpiperidin-4-yl)-amino-s-triazin-2-yl]-1,10-diamino-4,7-diazadecane;

octamethylene bis(2,2,6,6-tetramethylpiperidin-4-carboxylate);

N-2,2,6,6-tetramethylpiperidin-4-yl-n-dodecylsuccinimide;

N-1,2,2,6,6-pentamethylpiperidin-4-yl-n-dodecylsuccinimide;

N-1-acetyl-2,2,6,6-tetramethylpiperidin-4-yln-dodecylsuccinimide;

4-$C_{15}$-$C_{17}$alkanoyloxy-2,2,6,6-tetramethylpiperidine;

polycondensation product of 2,4-dichloro-6-cyclohexylamino-s-triazine and 4,4'-hexamethylenebis(amino-2,2,6,6-tetramethylpiperidine);

1,5-bis(2,2,6,6-tetramethylpiperidin-4-yl)-1,5-diaza-4-oxopropane;

copolymer of methyl methacrylate, ethyl acrylate and 2,2,6,6-tetramethylpiperidin-4-yl acrylate;

copolymer of N-octadecylmaleimide, styrene and N-(2,2,6,6-tetramethylpiperidin-4yl)maleimide;

1,3,5-tris[3-(2,2,6,6-piperidin-4-ylamino)-2-hydroxy-propyl)isocyanurate;

olefin copolymer containing units derived from N-[2-(2,2,6,6-tetramethylpiperidin-4-yl)-oxalamid-1-yl]maleimide;

2,2,4,4-tetramethyl-7-oxa-3,20-diaza-21-oxo-dispiro[5,1,11,2]heneicosane;

$C_{12}$-$C_{14}$alkyl 3-(2,2,4,4-tetramethyl-7-oxa-3,20-diaza-21-oxo-dispiro[5,1,11,2]heneicosane-20-yl)propionate;

reaction product of epichlorohydrin and 2,2,4,4-tetramethyl-7-oxa-3,20-diaza-21-oxo-dispiro[5,1,11,2]heneicosane;

1,3-di(2,2,6,6-tetramethylpiperidin-4-yl) 2,4-ditridecyl butanetetracarboxylate;

1,3-di(1,2,2,6,6-pentamethylpiperidin-4-yl) 2,4-ditridecyl butanetetracarboxylate;

polycondensation product of 3,9-bis(1,1-dimethyl-2-hydroxyethyl)-2,4,8,10-tetraoxaspiro-[5.5]undecane, tetramethyl 1,2,3,4-butanetetra-carboxylate and 2,2,6,6-tetramethyl-4-hydroxypiperidine;

polycondensation product of 3,9-bis(1,1-dimethyl-2-hydroxyethyl)-2,4,8,10-tetraoxaspiro-[5.5]undecane, tetramethyl 1,2,3,4-butanetetra-carboxylate and 1,2,2,6,6-pentamethyl-4-hydroxypiperidine;

1,4-bis(2,2,6,6-tetramethylpiperidin-4-yl)-2,2-dimethyl-1,4-diaza-4-oxopropane;

reaction product of 4-amino-2,2,6,6-tetramethylpiperidine and tetramethylolacetylene-diurea;

1,6-hexamethylenebis[N-formyl-N-(2,2,6,6-tetramethylpiperidin-4-yl)amine];

copolymer of N-(2,2,6,6-tetramethylpiperdin-4-yl)maleimide and a $C_{20}$-$C_{24}$-alpha-olefin;

poly[3-(2,2,6,6-tetramethylpiperidin-4-yloxy)propyl-methyl-siloxane];

polycondensation product of 2,4-dichloro-6-[N-butyl-N-(2,2,6,6-tetramethylpiperidin-4-yl)amino]-s-triazine and 1,10-diamino-4,7-diazadecane;

dodecyl 3-(2,2,4,4-tetramethyl-7-oxa-3,20-diaza-21-oxo-dispiro[5,1,11,2]heneicosane-20-yl)propionate;

1-cyclohexyloxy-2,2,6,6-tetramethyl-4-octadecylaminopiperidine;

bis(1-octyloxy-2,2,6,6-tetramethylpiperidin-4-yl)sebacate;

(2,4-bis[(1-cyclohexyloxy-2,2,6,6-tetramethylpiperidin-4-yl)butylamino]-6-(2-hydroxyethylamino-s-triazine;

bis(1-cyclohexyloxy-2,2,6,6-tetramethylpiperidin-4-yl)adipate;

2,4-bis[(1-cyclohexyloxy-2,2,6,6-piperidin-4-yl)butylamino]-6-chloro-s-triazine;

1-(2-hydroxy-2-methylpropoxy)-4-hydroxy-2,2,6,6-tetramethylpiperidine;

1-(2-hydroxy-2-methylpropoxy)-4-oxo-2,2,6,6-tetramethylpiperidine;

1-(2-hydroxy-2-methylpropoxy)-4-octadecanoyloxy-2,2,6,6-tetramethylpiperidine;

bis(1-(2-hydroxy-2-methylpropoxy)-2,2,6,6-tetramethylpiperidin-4-yl)sebacate;

bis(1-(2-hydroxy-2-methylpropoxy)-2,2,6,6-tetramethylpiperidin-4-yl)adipate;

2,4-bis{N-[1-(2-hydroxy-2-methylpropoxy)-2,2,6,6-tetramethylpiperidin-4-yl]-N-butylamino}-6-(2-hydroxyethylamino)-s-triazine;

the reaction product of 2,4-bis[(1-cyclohexyloxy-2,2,6,6-piperidin-4-yl)butylamino]-6-chloro-s-triazine with N,N'-bis(3-aminopropyl)ethylenediamine) [CAS Reg. No. 191680-81-6]; and the compound of formula polycondensation product of 1-(2-hydroxyethyl)-2,2,6,6-tetramethyl-4-hydroxypiperidine and succinic acid;

N, N',N'', N'''-tetrakis[(4,6-bis(butyl-1,2,2,6,6-pentamethylpiperidin-4-yl)-amino-s-triazin-2-yl]-1,10-diamino-4,7-diazadecane;

bis(1-octyloxy-2,2,6,6-tetramethylpiperidin-4-yl)sebacate;

2,4-bis[(1-cyclohexyloxy-2,2,6,6-tetramethylpiperidin-4-yl)butylamino]-6-(2-hydroxyethylamino-s-triazine;

bis(1-cyclohexyloxy-2,2,6,6-tetramethylpiperidin-4-yl)adipate;

2,4-bis[(1-cyclohexyloxy-2,2,6,6-piperidin-4-yl)butylamino]-6-chloro-s-triazine;

1-(2-hydroxy-2-methylpropoxy)-4-hydroxy-2,2,6,6-tetramethylpiperidine;

1-(2-hydroxy-2-methylpropoxy)-4-oxo-2,2,6,6-tetramethylpiperidine;

1-(2-hydroxy-2-methylpropoxy)-4-octadecanoyloxy-2,2,6,6-tetramethylpiperidine;

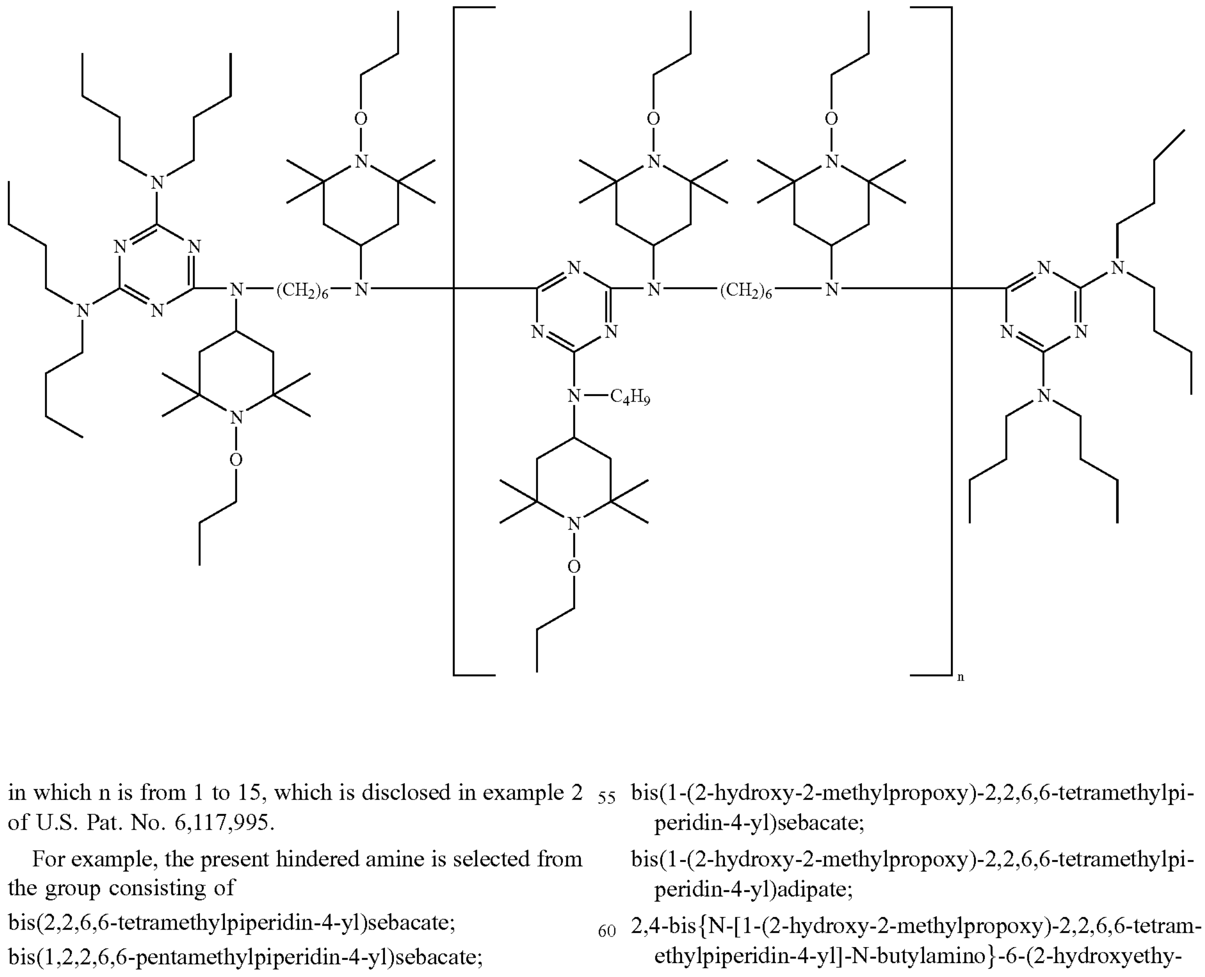

in which n is from 1 to 15, which is disclosed in example 2 of U.S. Pat. No. 6,117,995.

For example, the present hindered amine is selected from the group consisting of bis(2,2,6,6-tetramethylpiperidin-4-yl)sebacate;

bis(1,2,2,6,6-pentamethylpiperidin-4-yl)sebacate;

di(1,2,2,6,6-pentamethylpiperidin-4-yl) (3,5-di-tert-butyl-4-hydroxybenzyl)butylmalonate;

polycondensation product of 2,4-dichloro-6-tert-octylamino-s-triazine and 4,4'-hexamethylenebis(amino-2,2,6,6-tetramethylpiperidine);

bis(1-(2-hydroxy-2-methylpropoxy)-2,2,6,6-tetramethylpiperidin-4-yl)sebacate;

bis(1-(2-hydroxy-2-methylpropoxy)-2,2,6,6-tetramethylpiperidin-4-yl)adipate;

2,4-bis{N-[1-(2-hydroxy-2-methylpropoxy)-2,2,6,6-tetramethylpiperidin-4-yl]-N-butylamino}-6-(2-hydroxyethylamino)-s-triazine;

the reaction product of 2,4-bis[(1-cyclohexyloxy-2,2,6,6-piperidin-4-yl)butylamino]-6-chloro-s-triazine with N,N'-bis(3-aminopropyl)ethylenediamine) [CAS Reg. No. 191680-81-6]; and or the compound of formula

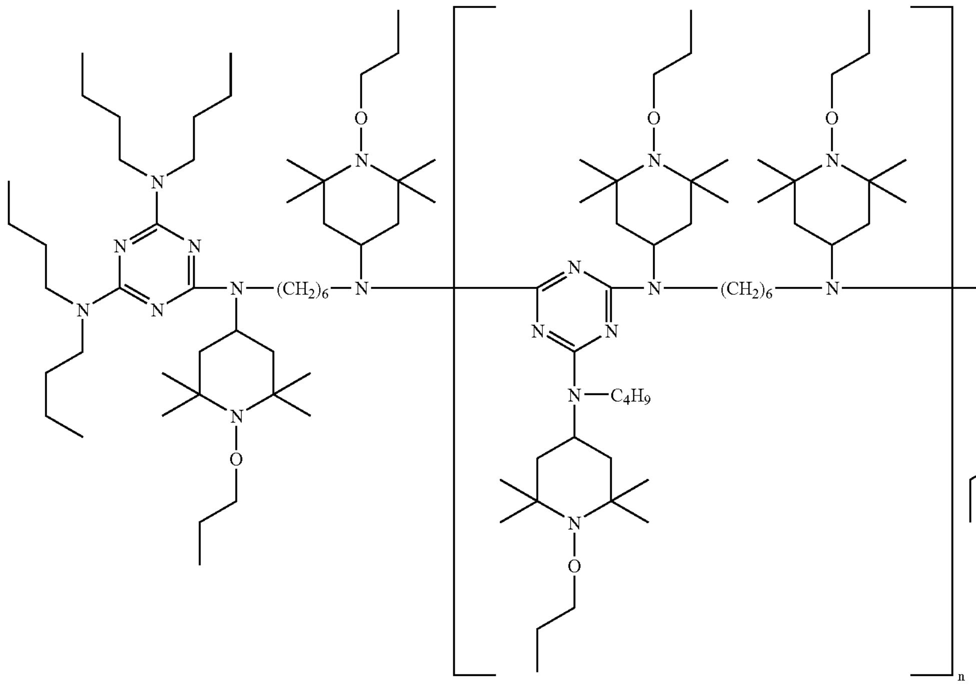

in which n is from 1 to 15.

It is contemplated that combinations of different classes of ultraviolet light absorbers may be employed. Likewise different classes of hindered amines may be employed (e.g. an unsubstituted hindered amine and an N-alkoxy hindered amine). Also combinations of ultraviolet light abosrbers and hindered amines may advantageously be employed.

The light stabilizers are employed in the composites of this invention at a level of from about 0.1% to about 5% by weight, for example from about 0.2% to about 3% by weight, or from about 0.5% to about 2% by weight, based on the weight of the entire mixture. For instance, the light stabilizers are present from about 0.1% to about 3%, from about 0.1% to about 2%, from about 0.2% to about 5%, or from about 0.5% to about 5% by weight, based on the weight of the entire mixture.

The oxides, hydroxides or silicates of Ca, Mg, Al and Zn are present in the composites of this invention from about 0.5% to about 10% by weight, based on the weight of the entire mixture. For example these additives are present from about 1% to about 8%, from about 2% to about 6% or from about 3% to about 5% by weight, based on the weight of the mixture. For example, these additives are present from about 0.5% to about 5%, from about 0.5% to about 6%, or from about 0.5% to about 8% by weight. For instance, these additives are present from about 1% to 10%, from about 2% to about 10%, or from about 3% to about 10% by weight.

Calcium oxide (CaO), magnesium oxide (MgO) and zinc oxide (ZnO) are particular examples of additives that are especially effective in the present invention.

Natural products composites are provided by the combination of wood fibers or flour (sawdust), coconut shells, sugar cane begasse, flax, hemp, jute, kenaf, rice husk and the like with thermoplastic resins. They may for example be natural fiber/plastic composites as disclosed in U.S. Pat. Nos. 6,290,885 and 6,511,757 the relevant disclosures of which is hereby incorporated by reference. Both the thermoplastic resin component and the natural products component may come from recycled materials.

The composites are in the form of extruded products, for example, pressed wood, particle board, chip board, wafer board, plywood, laminated materials and the like.

The composites may be employed as construction and building materials, for example decking, fencing, frames and molding, window and door profiles, shingles, roofing, siding and the like. They may be employed in for example automotive applications, e.g. interior panels, rear shelves, and spare tire covers. The natural products composites are suitable for infrastructure applications, for example boardwalks, docks and related structures. They may also be used in consumer/industrial applications, for instance as picnic tables, park benches, pallets, etc. The composites may be used to replace parts currently being produced from wood, thermoplastics or metal, or combinations thereof.

The thermoplastic resins are synthetic resins and are selected from:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE);
2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE);

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides;

4. Hydrocarbon resins (for example $C_5$-$C_9$) including hydrogenated modifications thereof (e.g. tackifiers) and mixtures of polyalkylenes and starch;

Homopolymers and copolymers from 1.)-4.) may have any stereostructure including syndiotactic, isotactic, hemi-isotactic or atactic; where atactic polymers are preferred. Stereoblock polymers are also included;

5. Polystyrene, poly(p-methylstyrene), poly($\alpha$-methylstyrene);

6. Aromatic homopolymers and copolymers derived from vinyl aromatic monomers including styrene, $\alpha$-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included;

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene;

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH);

6c. Hydrogenated aromatic polymers derived from hydrogenation of polymers mentioned under 6a.);

Homopolymers and copolymers may have any stereostructure including syndiotactic, isotactic, hemi-isotactic or atactic; where atactic polymers are preferred. Stereoblock polymers are also included;

7. Graft copolymers of vinyl aromatic monomers such as styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers;

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride (PVC), polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers;

9. Polymers derived from $\alpha,\beta$-unsaturated acids and derivatives thereof such as polyacrylates and polymethacrylates; polymethyl methacrylates, polyacrylamides and polyacrylonitriles, impact-modified with butyl acrylate;

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers;

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above;

12. Homopolymers and copolymers of cyclic ethers such as polyalkylene glycols, polyethylene oxide, polypropylene oxide or copolymers thereof with bisglycidyl ethers;

13. Polyacetals such as polyoxymethylene and those polyoxymethylenes which contain ethylene oxide as a comonomer; polyacetals modified with thermoplastic polyurethanes, acrylates or MBS;

14. Polyphenylene oxides and sulfides, and mixtures of polyphenylene oxides with styrene polymers or polyamides;

15. Polyurethanes derived from hydroxyl-terminated polyethers, polyesters or polybutadienes on the one hand and aliphatic or aromatic polyisocyanates on the other, as well as precursors thereof;

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems);
17. Polyureas, polyimides, polyamide-imides, polyetherimides, polyesterimides, polyhydantoins and polybenzimidazoles;
18. Polyesters derived from dicarboxylic acids and diols and/or from hydroxycarboxylic acids or the corresponding lactones, for example polyethylene terephthalate (PET), polyethylene terephthalate glycol modified (PETG), polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS;
19. Polycarbonates and polyester carbonates;
20. Polyketones;
21. Polysulfones, polyether sulfones and polyether ketones;
22. Crosslinked polymers derived from aldehydes on the one hand and phenols, ureas and melamines on the other hand, such as phenol/formaldehyde resins, urea/formaldehyde resins and melamine/formaldehyde resins;
23. Drying and non-drying alkyd resins;
24. Unsaturated polyester resins derived from copolyesters of saturated and unsaturated dicarboxylic acids with polyhydric alcohols and vinyl compounds as crosslinking agents, and also halogen-containing modifications thereof of low flammability;
25. Crosslinkable acrylic resins derived from substituted acrylates, for example epoxy acrylates, urethane acrylates or polyester acrylates;
26. Alkyd resins, polyester resins and acrylate resins crosslinked with melamine resins, urea resins, isocyanates, isocyanurates, polyisocyanates or epoxy resins;
27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators; and
28. Blends of the aforementioned polymers (polyblends), for example PP/EPDM, Poly-amide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Polyolefins, i.e. the polymers of monoolefins exemplified in the preceding paragraph, preferably polyethylene and polypropylene, can be prepared by different, and especially by the following, methods:

a) radical polymerization (normally under high pressure and at elevated temperature).
b) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III)chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

In particular, the present thermoplastic resin is selected from polyethylene (PE), polypropylene (PP), polystyrene (PS) and polyvinyl chloride (PVC).

In particular, the composites of the present invention are PE, PP, PS or PVC with wood flour.

Any moldable polyolefin or mixture of polyolefins may be used for purposes of the present invention, including high and low density polyethylene, polypropylene, ionomers, other copolymers, including engineered thermoplastic polyolefin (TPO), which may consist of polypropylene compounded with rubber. The polyolefin component are for example selected from the group consisting of HDPE and polypropylene, for example from post consumer or post industrial waste plastics, specifically waste HDPE, such as that reclaimed from used milk jugs or grocery bags. It should be apparent to one skilled in the art that virgin plastic may be used equally effectively, although the benefit of productively utilizing waste plastic is then lost.

The composites of the present invention contain for example about 20% to about 80% by weight thermoplastic resin based on the entire mixture. For example, the thermoplastic resin is present from about 30% to about 50%, or from about 35% to about 45% by weight based on the entire mixture. Accordingly, the natural products are present from about 80% to about 20%, about 70% to about 50%, or about 65% to about 55% by weight, based on the weight of the entire mixture.

Further additives may be employed in the composites of the present invention. For example, processing stabilizers selected from the group consisting of the hindered phenolic antioxidants, organic phosphorus compounds, hydroxylamines, nitrones, amine oxides and benzofuranones.

The present mixtures may further include hydrotalcite. Hydrotalcite is also known as hycite or DHT4A.

Hydrotalcites are natural or synthetic. The natural hydrotalcite is held to possess a structure $Mg_6Al_2(OH)_{16}CO_3.4H_2O$.

A typical empirical formula of a synthetic hydrotalcite is $Al_2Mg_{4.35}OH_{11.36}CO_{3(1.67)}.xH_2O$.

Examples of the synthetic product include: $Mg_{0.7}Al_{0.3}(OH)_2(CO_3)_{0.15}.0.54H_2O$, $Mg_{4.5}Al_2(OH)_{13}CO_3.3.5H_2O$ and $Mg_{4.2}Al(OH)_{12.4}CO_3$.

The present mixtures may further include clays or nano-scaled fillers.

The nano-scaled fillers have a particle size below about 200 nm, preferably below about 100 nm and more preferably below about 50 nm.

Nano-scaled fillers are for example nano-scaled oxides made by gas-phase or sol-gel processes, for example $SiO_2$, $SiO_2$ [e.g. Aerosil® from Degussa; Ludox® from DuPont; Snowtex® from Nissan Chemical; Levasil® from Bayer; or Sylysia® from Fuji Silysia Chemical], $TiO_2$ [e.g. NanoTek® from Nanophase], $ZrO_2$, $SnO_2$, MgO, ZnO [e.g. Activox® B or Durhan® TZO from Elementis], $CeO_2$, $Al_2O_3$, $In_2O_3$ or mixed oxides, including colloidal silica [e.g.Klebosol®], or organosols [e.g. Hilink® OG from Clariant], or polyhedral oligomeric silsesquioxanes [e.g. POSS® from Hybrid Plastics] with compatibilizing or reactive organic modifications like hydrocarbon, silane or siloxane chains, with or without functional groups such as hydroxyl, amino, mercapto, epoxy or ethylenic groups, or natural or modified semi-synthetic or synthetic [e.g. Somasif® from CO-OP Chemicals] phyllosilicates, organophilic precipitated calcium carbonate [e.g. Socal® from Solvay] or anion exchanging hydrotalcite [e.g. Hycite®713 from Ciba Specialty Chemicals].

Fillers are for example organophilically modified natural or synthetic phyllosilicates or a mixture of such phyllosilicates. Especially preferred fillers are organophilically modified montmorillonites [e.g. Nanomer® from Nanocor or Nanofil® from Suedchemie], bentonites [e.g. Cloisite® from Southern Clay Products], beidellites, hectorites, saponites, nontronites, sauconites, vermiculites, ledikites, magadiites, kenyaites or stevensites.

The mixtures of this invention may further include additional biocides such as antibacterial and/or anti algae compounds. For example, anti algae compounds such as 2-methylthio-4-cyclopropylamino-6-(α,β-dimethylpropylamino)-s-triazine, 4,5-dichlor-N-n-octyl-isothiazolin-3-one, 2-methylthio-4-cyclopropylamino-6-tert-butylamino-s-triazine and 2-methylthio-4-ethylamino-6-(α,β-dimethylpropylamino)-s-triazine, and antibacterial compounds such as silver, colloidal silver, nano-silver, silver coated particles, silver compounds such as $Ag_2O$, AgCl, $AgNO_3$, $Ag_2SO_4$, silver-zeolites, silver-glass compounds and silver-zirconate.

Other further additives that may be employed are processing aids/lubricants, for example for improvement of extrusion capacity, chemical foaming agents, for example for reduction of weight, impact modifiers, bonding agents, colorants, fillers, crosslinking agents and flame retardants.

Known flame retardants are for example organohalogen compounds, melamine based compounds, phosphorus containing compounds and metal hydroxides.

The present antifungal agent, light stabilizers and oxides, hydroxides or silicates of Ca, Mg, Al or Zn, and additional further additives, are incorporated into the compositions of the present invention via extrusion compounding.

The additives of the invention and optional further components may be added to the composite material individually or mixed with one another. If desired, the individual components can be mixed with one another before incorporation into the composite for example by dry blending, compaction, as a masterbatch or in the melt.

The incorporation of the additives of the invention and optional further components into the composite is carried out by known methods such as dry blending in the form of a powder, or wet mixing in the form of solutions, dispersions or suspensions for example in an inert solvent, water or oil. The additives of the invention and optional further additives may be incorporated, for example, before or after molding or also by applying the dissolved or dispersed additive or additive mixture to the composite material, with or without subsequent evaporation of the solvent or the suspension/dispersion agent. They may be added directly into the processing apparatus (e.g. extruders, internal mixers, etc), e.g. as a dry mixture or powder or as solution or dispersion or suspension or melt.

The incorporation can be carried out in any heatable container equipped with a stirrer, e.g. in a closed apparatus such as a kneader, mixer or stirred vessel. The incorporation is preferably carried out in an extruder or in a kneader. It is immaterial whether processing takes place in an inert atmosphere or in the presence of oxygen.

The addition of the additive or additive blend to the composite can be carried out in all customary mixing machines in which the thermoplastic resin is melted and mixed with the additives. Suitable machines are known to those skilled in the art. They are predominantly mixers, kneaders and extruders.

The process is preferably carried out in an extruder by introducing the additive or additives during processing.

Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Melt processing includes for example extrusion, co-kneading, pultrusion and injection molding.

Suitable extruders and kneaders are described, for example, in *Handbuch der Kunststoffextrusion*, Vol. 1 Grundlagen, Editors F. Hensen, W. Knappe, H. Potente, 1989, pp. 3-7, ISBN:3-446-14339-4 (Vol. 2 *Extrusionsanlagen* 1986, ISBN 3-446-14329-7).

For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components are added, these can be premixed or added individually.

The additives of the invention and optional further additives can also be added to the composite in the form of a masterbatch ("concentrate") which contains the additives in a concentration of, for example, about 1% to about 90%, about 1% to about 75%, or about 2% to about 65% by weight based on the weight of the carrier resin. The carrier resin may not necessarily be of identical structure to the thermoplastic resin where the additives are added finally.

In such operations, the carrier resin can be used in the form of powder, granules, solutions, suspensions or in the form of latices.

It is advantageous to employ polyesters as the carrier resin, for example PET, PET copolymers or PETG. For example, it is advantageous to add the present additives via a PET carrier resin in a polyolefin composite. The real benefits of incorporating the present additives via a concentrate vs. using mixtures of neat additives are:

better handling, improved industrial hygiene and environmental concerns and improved control of dosing accuracy.

The additives of the invention can be added as is or else in encapsulated form (for example in waxes, oils or polymers).

Polyesters suitable as carrier resins in the present invention are well known and are described for example in U.S. Pat. No. 5,807,932, the relevant parts of which are hereby incorporated by reference.

Polyesters, i.e. both fresh polyesters and recycled polyesters, can be homopolyesters or copolyesters built up from aliphatic, cycloaliphatic or aromatic dicarboxylic acids and diols or hydroxycarboxylic acids.

The aliphatic dicarboxylic acids can contain from 2 to 40 carbon atoms, the cycloaliphatic dicarboxylic acids can contain from 6 to 10 carbon atoms, the aromatic dicarboxylic acids can contain from 8 to 14 carbon atoms, the aliphatic hydroxycarboxylic acids can contain from 2 to 12 carbon atoms and the aromatic and cycloaliphatic hydroxycarboxylic acids can contain from 7 to 14 carbon atoms.

The aliphatic diols can contain from 2 to 12 carbon atoms, the cycloaliphatic diols can contain from 5 to 8 carbon atoms and the aromatic diols can contain from 6 to 16 carbon atoms.

The term aromatic diols is taken to mean diols in which two hydroxyl groups are bonded to one or to different aromatic hydrocarbon radicals.

It is furthermore possible for the polyesters to be branched by small amounts, for example 0.1 to 3 mol %, based on the dicarboxylic acids present, of monomers having a functionality of greater than two (for example pentaerythritol, trimellitic acid, 1,3,5-tri-(hydroxyphenyl)benzene, 2,4-dihydroxybenzoic acid or 2-(4-hydroxyphenyl)-2-(2,4-dihydroxyphenyl)propane).

In polyesters comprising at least two monomers, the latter can be randomly distributed or arranged in the form of blocks.

Suitable dicarboxylic acids are linear and branched, saturated, aliphatic dicarboxylic acids, aromatic dicarboxylic acids and cycloaliphatic dicarboxylic acids.

Suitable aliphatic dicarboxylic acids are those having from 2 to 40 carbon atoms, for example oxalic acid, malonic acid, dimethylmalonic acid, succinic acid, pimelic acid, adipic acid, trimethyladipic acid, sebacic acid, azelaic and dimeric acids (products of the dimerization of unsaturated, aliphatic carboxylic acids, such as oleic acid), and alkylated malonic and succinic acids, such as octadecylsuccinic acid.

Suitable cycloaliphatic dicarboxylic acids are 1,3-cyclobutanedicarboxylic acid, 1,3-cyclopentanedicarboxylic acid, 1,3- and 1,4-cyclohexanedicarboxylic acid, 1,3- and 1,4-(dicarboxymethyl)cyclohexane and 4,4'-dicyclohexyldicarboxylic acid.

Suitable aromatic dicarboxylic acids are in particular terephthalic acid, isophthalic acid, o-phthalic acid, 1,3-, 1,4-, 2,6- and 2,7-naphthalenedicarboxylic acid, 4,4'-biphenyidicarboxylic acid, di(4-carboxyphenyl)sulfone, 4,4'-benzophenonedicarboxylic acid, 1,1,3-trimethyl-5-carboxy-3-(p-carboxyphenyl)indane, di(4-carboxyphenyl)ether, bis(p-carboxyphenyl)methane and bis(p-carboxyphenyl)ethane.

Preference is given to aromatic dicarboxylic acids, in particular terephthalic acid, isophthalic acid and 2,6-naphthalenedicarboxylic acid.

Further suitable dicarboxylic acids are those containing —CO—NH— groups; they are described in DE-A-2 414 349. Also suitable are dicarboxylic acids containing N-heterocyclic rings, for example those derived from carboxyalkylated, carboxyphenylated or carboxybenzylated monoamino-s-triazinedicarboxylic acids (cf. DE-A 2 121 184 and 2 533 675), mono- or bishydantoins, halogenated or unhalogenated benzimidazoles or parabanic acid. The carboxyalkyl groups in these compounds can contain from 3 to 20 carbon atoms.

Suitable aliphatic diols are linear and branched aliphatic glycols, in particular those having from 2 to 12, in particular from 2 to 6, carbon atoms in a molecule, for example ethylene glycol, diethylene glycol, 1,2- and 1,3-propylene glycol, 1,2-, 1,3-, 2,3- and 1,4-butanediol, pentyl glycol, neopentyl glycol, 1,6-hexanediol and 1,12-dodecanediol. An example of a suitable cycloaliphatic diol is 1,4-dihydroxycyclohexane. Further suitable aliphatic diols are, for example, 1,4-bis(hydroxymethyl)cyclohexane, aromatic-aliphatic diols, such as p-xylylene glycol and 2,5-dichloro-p-xylylene glycol, 2,2-(β-hydroxyethoxyphenyl)propane and polyoxyalkylene glycols, such as diethylene glycol, triethylene glycol, polyethylene glycol and polypropylene glycol. The alkylenediols are preferably linear and contain, in particular, from 2 to 4 carbon atoms.

Preferred diols are alkylenediols, 1,4-dihydroxycyclohexane and 1,4-bis(hydroxymethyl)cyclohexane. Particular preference is given to ethylene glycol, diethylene glycol, 1,4-bis(hydroxymethyl)cyclohexane, 1,4-butanediol and 1,2- and 1,3-propylene glycol.

Further suitable aliphatic diols are β-hydroxyalkylated, in particular β-hydroxyethylated bisphenols, such as 2,2-bis(4'-(β-hydroxyethoxy)phenyl)propane. Further bisphenols are given below.

A further group of suitable aliphatic diols comprises the heterocyclic diols described in DE-A 1 812 003, 2 342 432, 2 342 372 and 2 453 326. Examples are N,N'-bis(β-hydroxyethyl)-5,5-dimethylhydantoin, N,N'-bis(β-hydroxypropyl)-5,5-dimethylhydantoin, methylenebis(N-(β-hydroxyethyl)-5-methyl-5-ethylhydantoin), methylenebis(N-(β-hydroxyethyl)-5,5-dimethylhydantoin), N,N'-bis(β-hydroxyethyl)benzimidazolone, N,N'-bis(β-hydroxyethyl) tetrachlorobenzimidazolone and N,N'-bis(β-hydroxyethyl) tetrabromobenzimidazolone.

Suitable aromatic diols are monocyclic diphenols and in particular bicyclic diphenols carrying a hydroxyl group on each aromatic ring. The term aromatic is preferably taken to mean hydrocarbon-aromatic radicals, for example phenylene or naphthylene. Besides, for example, hydroquinone, resorcinol and 1,5-, 2,6- and 2,7-dihydroxynaphthalene, particular mention should be made of the bisphenols which can be described by the following formulae:

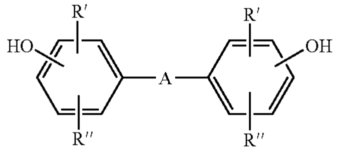

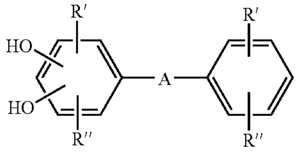

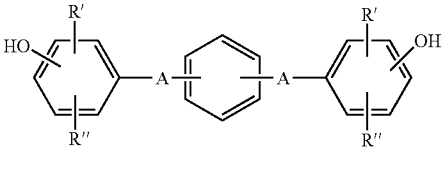

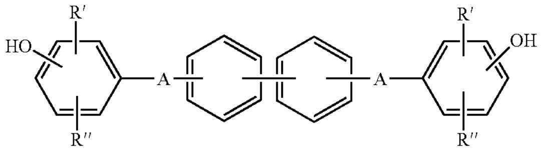

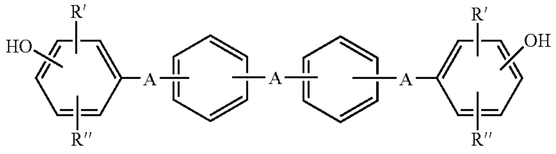

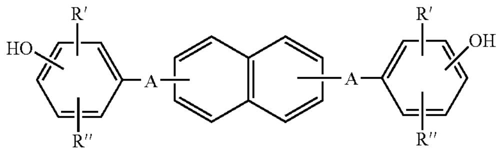

The hydroxyl groups can be in the m-position, but in particular in the p-position, R' and R" in these formulae can be alkyl having 1 to 6 carbon atoms, halogen, such as chlorine or bromine, or in particular hydrogen, and A can be a direct bond or —O—, —S—, —(O)S(O)—, —C(O)—, —P(O)($C_1$-$C_{20}$alkyl)-, substituted or unsubstituted alkylidene, cycloalkylidene or alkylene.

Examples of substituted or unsubstituted alkylidene are ethylidene, 1,1- and 2,2-propylidene, 2,2-butylidene, 1,1-isobutylidene, pentylidene, hexylidene, heptylidene, octylidene, dichloroethylidene and trichloroethylidene.

Examples of substituted or unsubstituted alkylene are methylene, ethylene, phenylmethylene, diphenylmethylene and methylphenylmethylene. Examples of cycloalkylidene are cyclopentylidene, cyclohexylidene, cycloheptylidene and cyclooctylidene.

Examples of bisphenols are bis(p-hydroxyphenyl)ether and thioether, bis(p-hydroxyphenyl)sulfone, bis(p-hydroxyphenyl)methane, bis(4-hydroxyphenyl)-2,2'-biphenyl, phenylhydroquinone, 1,2-bis(p-hydroxyphenyl)ethane, 1-phenylbis(p-hydroxyphenyl)methane, diphenylbis(p-hydroxyphenyl)methane, diphenylbis(p-hydroxyphenyl)ethane, bis(3,5-dimethyl-4-hydroxyphenyl)sulfone, bis(3,5-dimethyl-4-hydroxyphenyl)-p-diisopropylbenzene, bis(3,5-dimethyl-4-hydroxyphenyl)-m-diisopropylbenzene, 2,2-bis(3',5'-dimethyl-4'-hydroxyphenyl)propane, 1,1- and 2,2-bis(p-hydroxyphenyl)butane, 2,2-bis(p-hydroxyphenyl)hexafluoropropane, 1,1-dichloro- and 1,1,1-trichloro-2,2-bis(p-hydroxyphenyl)ethane, 1,1-bis(p-hydroxyphenyl)cyclopentane and in particular 2,2-bis(p-hydroxyphenyl)propane (bisphenol A) and 1,1-bis(p-hydroxyphenyl)cyclohexane (bisphenol C).

Suitable polyesters of hydroxycarboxylic acids are, for example, polycaprolactone, polypivalolactone and the polyesters of 4-hydroxycyclohexanecarboxylic acid and 4-hydroxybenzoic acid.

Also suitable are polymers containing predominantly ester bonds, but which can also contain other bonds, for example polyester amides and polyesterimides.

Polyesters with aromatic dicarboxylic acids have achieved the greatest importance, in particular the polyalkylene terephthalates. For example, the polyester is built up from at least 30 mol %, preferably at least 40 mol %, of aromatic dicarboxylic acids and at least 30 mol %, preferably at least 40 mol %, of alkylenediols, preferably having from 2 to 12 carbon atoms, based on the polyester.

In this case, the alkylenediol is in particular linear and contains from 2 to 6 carbon atoms, for example ethylene glycol, trimethylene glycol, tetramethylene glycol and hexamethylene glycol, and the aromatic dicarboxylic acid is in particular terephthalic acid and/or isophthalic acid.

Particularly suitable polyesters are PET, PBT and corresponding copolymers, special preference being given to PET and its copolymers. The process also achieves particular importance in the case of PET recyclates, which are obtained, for example, from bottle collections, for example collections by the drinks industry. These materials preferably comprise terephthalic acid, 2,6-naphthalenedicarboxylic acid and/or isophthalic acid in combination with ethylene glycol and/or 1,4-bis(hydroxymethyl)cyclohexane.

The materials containing the additives of the invention described herein can be used for the production of moldings, injection molded articles, profiles, and the like.

Also subject of the present invention are the molded articles prepared according to the processes of the present invention.

The present invention is further illustrated by the following Examples. Percentages and parts are by weight unless otherwise specified.

EXAMPLE 1

To a 1:1 mixture of 100 parts by weight wood flour/PE is added the following additive mixture:

2.00 parts CaO 0.50 parts ZnO 0.050 parts pentaerythritol tetrakis [3-(3,5-di-tert-butyl-4-hydroxyphenyl)propionate]

0.10 parts tris(2,4-di-tert-butylphenyl)phosphite 0.25 parts of a 1:1 mixture of the polycondensation product of 1-(2-hydroxyethyl)-2,2,6,6-tetramethyl-4-hydroxypiperidine and succinic acid, and the polycondensation product of 2,4-dichloro-6-tert-octylamino-s-triazine and 4,4'-hexamethylenebis(amino-2,2,6,6-tetramethylpiperidine) (HALS mixture)

0.10 parts calcium stearate 0.50 parts 2-(2-H-benzotriazol-2-yl)-4,6-ditert.pentylphenol (UVA)

0.25 parts thiabendazole

The additive mixture provides a total of 3.75 parts by weight based on the weight of the composite.

A control formulation is also prepared with no additives.

The mixtures are processed in a Haake mixer at 160° C. and the processed material is compression molded at 193° C. into 40 mil plaques.

The compositions are tested for color stability by placing 10 g of material together with 10 ml of distilled water in petri dish (3.5" diameter). An iron nail is placed on top of this mixture and the sample is left for three days at room temperature. The control formulation developed a strong discoloration (black) around the nail whereas the formulation containing the additives remained unchanged from the original appearance.

The compositions are also tested for weatherability according to ASTM G26, Method A (with spray cycle) in a Xenon-Arc WeatherOmeter. Color development is assessed by measuring yellowness index according to ASTM D1925:

| Exposure | initial | 3 weeks | 7 weeks |
|---|---|---|---|
| Control (no additives) | 54.8 | 26.7 | 12.8 |
| Formulation with additives | 50.4 | 42.1 | 35.1 |

Excellent results are achieved for prevention of color changes in the inventive compositions vs. the control.

EXAMPLE 2

An additive concentrate prepared by extrusion compounding a 2:1 ratio of additive blend/PET resin with a Leistritz twin-screw (18 mm) at 240° C. and a screw speed of 150 rpm. The additive blend is as follows:

67% CaO 1.3% pentaerythritol tetrakis [3-(3,5-di-tert-butyl-4-hydroxyphenyl)propionate]

2.6% tris(2,4-di-tert-butylphenyl)phosphite 6.5% of a 1:1 mixture of the polycondensation product of 1-(2-hydroxyethyl)-2,2,6,6-tetramethyl-4-hydroxypiperidine and succinic acid, and the polycondensation product of 2,4-dichloro-6-tert-octylamino-s-triazine and 4,4'-hexamethylenebis(amino-2,2,6,6-tetramethylpiperidine) (HALS mixture)

2.6% calcium stearate

7% thiabendazole

The additive concentrate is then let down in 1:1 mix of wood flour/PE via processing in a Haake mixer at 160° C. and the processed material is compression molded at 193° C. into 40 mil plaques.

The final letdown concentrations are 2%, 4%, 6% and 8% by weight of the additive blend based on the entire composition. A control sample is prepared with no additive blend.

The compositions are tested for antifungal activity according to ASTM G21. 2" by 2" pieces of compression molded samples are incubated at 28° C. for 21 days on agar substrate inoculated with Aureobasidium pollulans (ATCC 15233) and Penicillium pinophilum (ATCC 11797), respectively. No fungal growth is observed on all samples containing the additive concentrate and the following zone of inhibition of fungal growth is measured around the samples:

| | 0% | 2% | 4% | 6% | 8% |
|---|---|---|---|---|---|
| Aureobasidium pollulans | 0 mm | 11 mm | 17 mm | 18 mm | 20 mm |
| Penicillium pinophilum | 0 mm | 12 mm | 16 mm | 20 mm | >25 mm |

The compositions are also tested for weatherability according to ASTM G26, Method A (with spray cycle) in a Xenon-Arc WeatherOmeter. Color development is assessed by measuring yellowness index according to ASTM D1925:

| | 0% | 2% | 4% | 6% | 8% |
|---|---|---|---|---|---|
| initial | 56.7 | 58.6 | 57.7 | 57.9 | 57.3 |
| 10 weeks | 11.8 | 12.5 | 16.5 | 17.1 | 21.1 |

Excellent results are achieved for antifungal activity and prevention of color change in the inventive compositions vs. the control.

Antifungal efficacy against aspergillus niger is also found to be excellent.

What is claimed is:

1. A process for the preparation of natural products composites that are resistant to color change due to micro-organism growth, weathering and chemical interaction, which process comprises combining into a mixture at least one natural product, at least one thermoplastic resin, an effective amount of an antifungal agent, and melt processing the mixture.

2. A process for the preparation of natural products composites that are resistant to color change due to micro-organism growth, weathering and chemical interaction, which process comprises combining into a mixture at least one natural product, at least one thermoplastic resin, an effective amount of an antifungal agent, and at least one compound selected from the group consisting of the light stabilizers, and melt processing the mixture.

3. A process for the preparation of natural products composites that are resistant to color change due to micro-organism growth, weathering and chemical interaction, which process comprises combining into a mixture at least one natural product, at least one thermoplastic resin, an effective amount of an antifungal agent, and at least one compound selected from the group consisting of the oxides, hydroxides or silicates of Ca, Mg, Al and Zn, and melt processing the mixture.

4. A process for the preparation of natural products composites that are resistant to color change due to micro-organism growth, weathering and chemical interaction, which process comprises combining into a mixture at least one natural product, at least one thermoplastic resin, an effective amount of an antifungal agent, and at least one compound selected from the group consisting of the light stabilizers, and at least one compound selected from the group consisting of the oxides, hydroxides or silicates of Ca, Mg, Al and Zn, and melt processing the mixture.

5. A process according to claim 1 where the antifungal agent is selected from the group consisting of thiabendazole, 10,10' oxybisphenoxyarsine, tebuconazole, tolnaftate, zinc bis-(2-pyridinethiol-1-oxide), 2n-octyl-4-isothiazolin-3-one, 4,5-dichloro-octyl-4-isothiazoline, N-butyl-1,2-benzisothiazolin-3-one, carbendazole and mixtures thereof.

6. A process according to claim 1 where the antifungal agent is thiabendazole.

7. A process according to claim 1 where the antifungal agent is present at a level of from about 0.05% to about 1.0% by weight, based on the weight of the entire mixture.

8. A process according to claim 1 where the antifungal agent is present from about 0.1% to about 0.8% by weight, based on the weight of the entire mixture.

9. A process according to claim 2 in which the light stabilizers are selected from the group consisting of the ultraviolet light absorbers.

10. A process according to claim 9 in which the ultraviolet light absorbers are selected from the group consisting of the 2H-benzotriazoles, benzophenones, benzoic acid esters, acrylates, malonates, oxamides, salicylates, benzoxazin-4-ones and s-triazines.

11. A process according to claim 9 in which the ultraviolet light absorbers are selected from the group consisting of the 2H-benzotriazoles, benzophenones and s-triazines.

12. A process according to claim 9 in which the ultraviolet light absorbers are selected from the group consisting of 2-(2-hydroxy-5-methylphenyl)-2H-benzotriazole;

2-(2-hydroxy-5-tert-octylphenyl)-2H-benzotriazole;

2-(2-hydroxy-3,5-di-tert-amylphenyl)-2H-benzotriazole;

octyl 3-(benzotriazol-2-yl)-5-tert-butyl-4-hydroxyhydrocinnamate;

2-(2-hydroxy-3,5-di-tert-butylphenyl)-2H-benzotriazole;

2-(2-hydroxy-5-tert-butylphenyl)-2H-benzotriazole;

2-(2-hydroxy-3,5-di-tert-butylphenyl)-2H-benzotriazole;

2-(2-hydroxy-3-tert-butyl-5-methylphenyl)-2H-benzotriazole;

2-(2-hydroxy-3-sec-butyl-5-tert-butylphenyl)-2H-benzotriazole;

2-(2-hydroxy-4-octyloxyphenyl)-2H-benzotriazole;

2-(2-hydroxy-3-dodecyl-5-methylphenyl)-2H-benzotriazole;

2-[2-hydroxy-3,5-di(α,α-dimethylbenzyl)phenyl]-2H-benzotriazole;

2-[2-hydroxy-3-(α,α-dimethylbenzyl)-5-tert-octylphenyl]-2H-benzotriazole;

2-{2-hydroxy-3-tert-butyl-5-[2-(omega-hydroxy-octa(ethyleneoxy)carbonyl)ethyl]phenyl}-2H-benzotriazole;

2-{2-hydroxy-3-tert-butyl-5-[2-(octyloxy)carbonyl)ethyl]phenyl}-2H-benzotriazole;

5-trifluoromethyl-2-(2-hydroxy-3-α-cumyl-5-t-octylphenyl)-2H-benzotriazole;

5-chloro-2-(3,5-di-t-butyl-2-hydroxyphenyl)-2H-benzotriazole;

2-(3-t-butyl-2-hydroxy-5-(2-octyloxycarbonylethyl)phenyl)-5-chloro-2H-benzotriazole;

4-octyloxy-2-hydroxybenzophenone;

4-methoxy-2-hydroxybenzophenone;

4-methoxy-2,2'-dihydroxybenzophenone;

4,4'dimethoxy-2,2'-dihydroxybenzophenone;

2,4-bis[2-hydroxy-4-(3-butyloxy-2-hydroxypropoxy)phenyl]-6-mesityl-s-triazine;

2,4-bis(2,4-dimethylphenyl)-6-(2-hydroxy-4-octyloxyphenyl)-s-triazine;

2,4-diphenyl-6-(2-hydroxy-4-hexyloxyphenyl)-s-triazine;

2,4-bis(2,4-dimethylphenyl)-6-[2-hydroxy-4-(3-do-/tri-decyloxy-2-hydroxypropoxy)-phenyl]-s-triazine;

2,4-bis(2,4-dimethylphenyl)-6-[2-hydroxy-4-(3-do-/tri-decyloxy-2-hydroxypropoxy)-5-α-cumylphenyl]-s-triazine;

reaction product of 2,4,6-tris(2,4-dihydroxyphenyl)-s-triazine with isooctyl α-halopropionate;

2-(2,4-dibutyloxyphenyl)-4,6-bis(2-hydroxy-4-butyloxyphenyl)-s-triazine;

2,4-bis(4-biphenylyl)-6-(2-hydroxy-4-octyloxycarbonylethylideneoxyphenyl)-s-triazine;

2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine;

2,4-bis(2,4-dimethylphenyl)-6-[2-hydroxy-4-(3-benzyloxy-2-hydroxypropyloxy)phenyl]-s-triazine;

2,4-bis(2-hydroxy-4-butyloxyphenyl)-6-(2,4-di-butyloxyphenyl)-s-triazine;

2,4-bis(2,4-dimethylphenyl)-6-[2-hydroxy-4-(3-nonyloxy*-2-hydroxypropyloxy)-5-α-cumyl-phenyl]-s-triazine; (* denotes a mixture of octyloxy, nonyloxy and decyloxy groups)

methylenebis-{2,4-bis(2,4-dimethylphenyl)-6-[2-hydroxypropoxy)phenyl]-s-triazine}, methylene bridged dimer mixture bridged in the 3:5', 5:5' and 3:3' positions in a 5:4:1 ratio;

2,4,6-tris(2-hydroxy-4-isooctyloxycarbonylisopropylideneoxyphenyl)-s-triazine;

2,4-bis(2,4-dimethylphenyl)-6-(2-hydroxy-4-hexyloxy-5-α-cumylphenyl)-s-triazine; and 2,4,6-tris[2-hydroxy-4-(3-sec-butyloxy-2-hydroxypropyloxy)phenyl]-s-triazine.

13. A process according to claim 9 in which the ultraviolet light absorbers are selected from the group consisting of 2-(2-hydroxy-5-tert-octylphenyl)-2H-benzotriazole;

2-[2-hydroxy-3-(α,α-dimethylbenzyl)-5-tert-octylphenyl]-2H-benzotriazole;

2-{2-hydroxy-3-tert-butyl-5-[2-(omega-hydroxy-octa (ethyleneoxy)carbonyl)ethyl]phenyl}-2H-benzotriazole;

2-{2-hydroxy-3-tert-butyl-5-[2-(octyloxy)carbonyl) ethyl]phenyl}-2H-benzotriazole;

4-octyloxy-2-hydroxybenzophenone;

4-methoxy-2-hydroxybenzophenone;

2,4-bis[2-hydroxy-4-(3-butyloxy-2-hydroxypropoxy) phenyl]-6-mesityl-s-triazine;

reaction product of 2,4,6-tris(2,4-dihydroxyphenyl)-s-triazine with isooctyl α-halopropionate;

2,4-bis(4-biphenylyl)-6-(2-hydroxy-4-octyloxycarbonylethylideneoxyphenyl)-s-triazine;

2,4-bis(2,4-dimethylphenyl)-6-[2-hydroxy-4-(3-nonyloxy*-2-hydroxypropyloxy)-5-α-cumyl-phenyl]-s-triazine; (* denotes a mixture of octyloxy, nonyloxy and decyloxy groups) and 2,4,6-tris(2-hydroxy-4-isooctyloxycarbonylisopropylideneoxyphenyl)-s-triazine.

14. A process according to claim 2 in which the light stabilizers are selected from the group consisting of the sterically hindered amine light stabilizers.

15. A process according to claim 14 in which the sterically hindered amine light stabilizers are selected from the group consisting of bis(2,2,6,6-tetramethylpiperidin-4-yl)sebacate;

bis(1,2,2,6,6-pentamethylpiperidin-4-yl)sebacate;

di(1,2,2,6,6-pentamethylpiperidin-4-yl) (3,5-di-tert-butyl-4-hydroxybenzyl)butylmalonate;

4-benzoyloxy-2,2,6,6-tetramethylpiperidine;

4-stearyloxy-2,2,6,6-tetramethylpiperidine;

tris(2,2,6,6-tetramethylpiperidin-4-yl)nitrilotriacetate;

polycondensation product of 2,4-dichloro-6-tert-octylamino-s-triazine and 4,4'-hexamethylenebis(amino-2,2,6,6-tetramethylpiperidine);

polycondensation product of 1-(2-hydroxyethyl)-2,2,6,6-tetramethyl-4-hydroxypiperidine and succinic acid;

polycondensation product of 4,4'-hexamethylenebis-(amino-2,2,6,6-tetramethylpiperidine) and 1,2-dibromoethane;

tetrakis(2,2,6,6-tetramethylpiperidin-4-yl) 1,2,3,4-butanetetracarboxylate;

tetrakis(1,2,2,6,6-pentamethylpiperidin-4-yl) 1,2,3,4-butanetetracarboxylate;

polycondensation product of 2,4-dichloro-6-morpholino-s-triazine and 4,4'-hexamethylenebis(amino-2,2,6,6-tetramethylpiperidine);

N,N',N'',N'''-tetrakis[(4,6-bis(butyl-1,2,2,6,6-pentamethylpiperidin-4-yl)-amino-s-triazin-2-yl]-1,10-diamino-4,7-diazadecane;

octamethylene bis(2,2,6,6-tetramethylpiperidin-4-carboxylate);

N-2,2,6,6-tetramethylpiperidin-4-yl-n-dodecylsuccinimide;

N-1,2,2,6,6-pentamethylpiperidin-4-yl-n-dodecylsuccinimide;

N-1-acetyl-2,2,6,6-tetramethylpiperidin-4-yln-dodecylsuccinimide;

4-$C_{15}$-$C_{17}$alkanoyloxy-2,2,6,6-tetramethylpiperidine;

polycondensation product of 2,4-dichloro-6-cyclohexylamino-s-triazine and 4,4'-hexamethylenebis(amino-2,2,6,6-tetramethylpiperidine);

1,5-bis(2,2,6,6-tetramethylpiperidin-4-yl)-1,5-diaza-4-oxopropane;

copolymer of methyl methacrylate, ethyl acrylate and 2,2,6,6-tetramethylpiperidin-4-yl acrylate;

copolymer of N-octadecylmaleimide, styrene and N-(2,2,6,6-tetramethylpiperidin-4yl)maleimide;

1,3,5-tris[3-(2,2,6,6-piperidin-4-ylamino)-2-hydroxypropyl)isocyanurate;

olefin copolymer containing units derived from N-[2-(2,2,6,6-tetramethylpiperidin-4-yl)-oxalamid-1-yl]maleimide;

2,2,4,4-tetramethyl-7-oxa-3,20-diaza-21-oxo-dispiro[5,1,11,2]heneicosane;

$C_{12}$-$C_{14}$alkyl 3-(2,2,4,4-tetramethyl-7-oxa-3,20-diaza-21-oxo-dispiro[5,1,11,2]heneicosane-20-yl)propionate;

reaction product of epichlorohydrin and 2,2,4,4-tetramethyl-7-oxa-3,20-diaza-21-oxo-dispiro[5,1,11,2]heneicosane;

1,3-di(2,2,6,6-tetramethylpiperidin-4-yl) 2,4-ditridecyl butanetetracarboxylate;

1,3-di(1,2,2,6,6-pentamethylpiperidin-4-yl) 2,4-ditridecyl butanetetracarboxylate;

polycondensation product of 3,9-bis(1,1-dimethyl-2-hydroxyethyl)-2,4,8,10-tetraoxaspiro-[5.5]undecane, tetramethyl 1,2,3,4-butanetetra-carboxylate and 2,2,6,6-tetramethyl-4-hydroxypiperidine;

polycondensation product of 3,9-bis(1,1-dimethyl-2-hydroxyethyl)-2,4,8,10-tetraoxaspiro-[5.5]undecane, tetramethyl 1,2,3,4-butanetetra-carboxylate and 1,2,2,6,6-pentamethyl-4-hydroxypiperidine;

1,4-bis(2,2,6,6-tetramethylpiperidin-4-yl)-2,2-dimethyl-1,4-diaza-4-oxopropane;

reaction product of 4-amino-2,2,6,6-tetramethylpiperidine and tetramethylolacetylene-diurea;

1,6-hexamethylenebis[N-formyl-N-(2,2,6,6-tetramethylpiperidin-4-yl)amine];

copolymer of N-(2,2,6,6-tetramethylpiperdin-4-yl)maleimide and a $C_{20}$-$C_{24}$-alpha-olefin;

poly[3-(2,2,6,6-tetramethylpiperidin-4-yloxy)propyl-methyl-siloxane];

polycondensation product of 2,4-dichloro-6-[N-butyl-N-(2,2,6,6-tetramethylpiperidin-4-yl)amino]-s-triazine and 1,10-diamino-4,7-diazadecane;

dodecyl 3-(2,2,4,4-tetramethyl-7-oxa-3,20-diaza-21-oxo-dispiro[5,1,11,2]heneicosane-20-yl)propionate;

1-cyclohexyloxy-2,2,6,6-tetramethyl-4-octadecylaminopiperidine;

bis(1-octyloxy-2,2,6,6-tetramethylpiperidin-4-yl)sebacate;

(2,4-bis[(1-cyclohexyloxy-2,2,6,6-tetramethylpiperidin-4-yl)butylamino]-6-(2-hydroxyethylamino-s-triazine;

bis(1-cyclohexyloxy-2,2,6,6-tetramethylpiperidin-4-yl) adipate;

2,4-bis[(1-cyclohexyloxy-2,2,6,6-piperidin-4-yl)butylamino]-6-chloro-s-triazine;

1-(2-hydroxy-2-methylpropoxy)-4-hydroxy-2,2,6,6-tetramethylpiperidine;

1-(2-hydroxy-2-methylpropoxy)-4-oxo-2,2,6,6-tetramethylpiperidine;

1-(2-hydroxy-2-methylpropoxy)-4-octadecanoyloxy-2,2,6,6-tetramethylpiperidine;

bis(1-(2-hydroxy-2-methylpropoxy)-2,2,6,6-tetramethylpiperidin-4-yl)sebacate;

bis(1-(2-hydroxy-2-methylpropoxy)-2,2,6,6-tetramethylpiperidin-4-yl)adipate;

2,4-bis{N-[1-(2-hydroxy-2-methylpropoxy)-2,2,6,6-tetramethylpiperidin-4-yl]-N-butyl-amino}-6-(2-hydroxyethylamino)-s-triazine; the reaction product of 2,4-bis[(1-cyclohexyloxy-2,2,6,6-piperidin-4-yl)butylamino]-6-chloro-s-triazine with N,N'-bis(3-aminopropyl)ethylenediamine) [CAS Reg. No. 191680-81-6]; and the compound of formula N,N',N'',N'''-tetrakis[(4,6-bis(butyl-1,2,2,6,6-pentamethylpiperidin-4-yl)-amino-s-triazin-2-yl]-1,10-diamino-4,7-diazadecane;

bis(1-octyloxy-2,2,6,6-tetramethylpiperidin-4-yl)sebacate;

2,4-bis[(1-cyclohexyloxy-2,2,6,6-tetramethylpiperidin-4-yl)butylamino]-6-(2-hydroxyethylamino-s-triazine;

bis(1-cyclohexyloxy-2,2,6,6-tetramethylpiperidin-4-yl) adipate;

2,4-bis[(1-cyclohexyloxy-2,2,6,6-piperidin-4-yl)butylamino]-6-chloro-s-triazine;

1-(2-hydroxy-2-methylpropoxy)-4-hydroxy-2,2,6,6-tetramethylpiperidine;

1-(2-hydroxy-2-methylpropoxy)-4-oxo-2,2,6,6-tetramethylpiperidine;

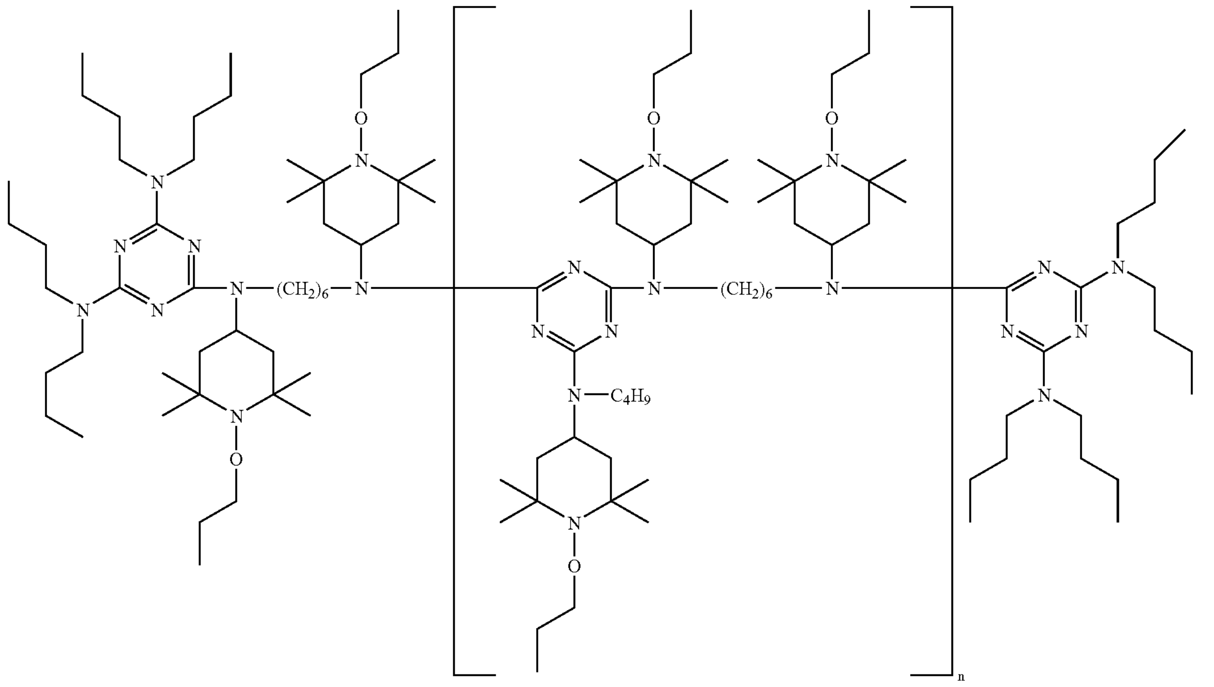

in which n is from 1 to 15.

16. A process according to claim 14 in which the sterically hindered amine stabilizers are selected from the group consisting of bis(2,2,6,6-tetramethylpiperidin-4-yl)sebacate;

bis(1,2,2,6,6-pentamethylpiperidin-4-yl)sebacate;

di(1,2,2,6,6-pentamethylpiperidin-4-yl) (3,5-di-tert-butyl-4-hydroxybenzyl)butylmalonate;

polycondensation product of 2,4-dichloro-6-tert-octylamino-s-triazine and 4,4'-hexamethylenebis(amino-2,2,6,6-tetramethylpiperidine);

polycondensation product of 1-(2-hydroxyethyl)-2,2,6,6-tetramethyl-4-hydroxypiperidine and succinic acid;

1-(2-hydroxy-2-methylpropoxy)-4-octadecanoyloxy-2,2,6,6-tetramethylpiperidine;

bis(1-(2-hydroxy-2-methylpropoxy)-2,2,6,6-tetramethylpiperidin-4-yl)sebacate;

bis(1-(2-hydroxy-2-methylpropoxy)-2,2,6,6-tetramethylpiperidin-4-yl)adipate;

2,4-bis{N-[1-(2-hydroxy-2-methylpropoxy)-2,2,6,6-tetramethylpiperidin-4-yl]-N-butyl-amino}-6-(2-hydroxyethylamino)-s-triazine;

the reaction product of 2,4-bis[(1-cyclohexyloxy-2,2,6,6-piperidin-4-yl)butylamino]-6-chloro-s-triazine with N,N'-bis(3-aminopropyl)ethylenediamine) [CAS Reg. No. 191680-81-6]; and the compound of formula

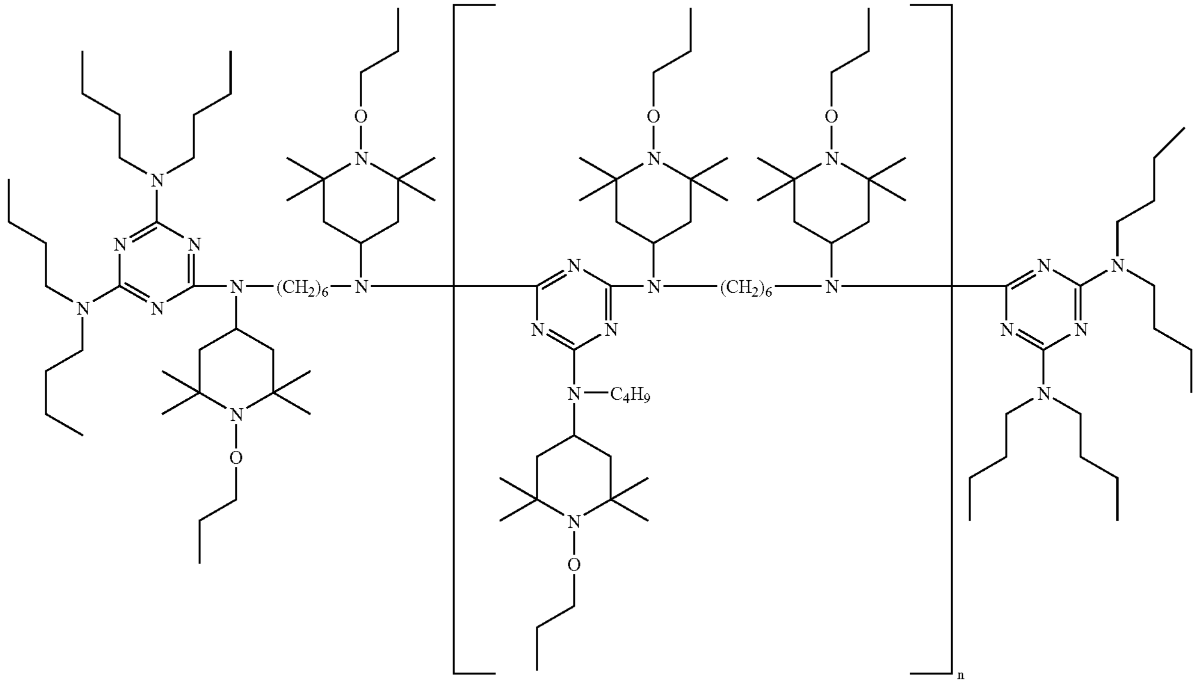

in which n is from 1 to 15.

17. A process according to claim 2 where the light stabilizers are present at a level of from about 0.1% to about 5% by weight, based on the weight of the entire mixture.

18. A process according to claim 2 where the light stabilizers are present at a level of from about 0.2% to about 3% by weight, based on the weight of the entire mixture.

19. A process according to claim 3 where the compound selected from the group consisting of the oxides, hydroxides or silicates of Ca, Mg, Al and Zn is hydrotalcite, $Al_2O_3$, CaO, MgO or ZnO.

20. A process according to claim 3 where the compound selected from the group consisting of the oxides, hydroxides or silicates of Ca, Mg, Al and Zn is CaO.

21. A process according to claim 3 where the oxides, hydroxides or silicates of Ca, Mg, Al and Zn are present from about 0.5% to about 10% by weight, based on the weight of the entire mixture.

22. A process according to claim 3 where the oxides, hydroxides or silicates of Ca, Mg, Al and Zn are present from about 2% to about 6% by weight, based on the weight of the entire mixture.

23. A process according to claim 2 comprising at least two different sterically hindered amine light stabilizers.

24. A process according to claim 2 comprising at least one sterically hindered amine light stabilizer and at least one ultraviolet light absorber.

25. A process according to claim 1 wherein the natural product is selected from the group consisting of wood, sawdust, coconut shells, sugar cane begasse, flax, hemp, jute, kenaf and rice husk.

26. A process according to claim 1 where the thermoplastic resin is selected from the group consisting of polyethylene, polypropylene, engineered thermoplastic polyolefin (TPO), polystyrene, polyvinyl chloride and mixtures thereof.

27. A process according to claim 1 where the natural product is wood, kenaf or flax and the thermoplastic resin is polyethylene or polypropylene.

28. A process according to claim 1 wherein the antifungal agent is added to the mixture in the form of a carrier resin concentrate.

29. A process according to claim 2 wherein the antifungal agent and the light stabilizers are added to the mixture in the form of a carrier resin concentrate.

30. A process according to claim 3 wherein the antifungal agent and the oxides, hydroxides or silicates of Ca, Mg, Al and Zn are added to the mixture in the form of a carrier resin concentrate.

31. A process according to claim 4 wherein the antifungal agent, the light stabilizers, and the oxides, hydroxides or silicates of Ca, Mg, Al and Zn are added to the mixture in the form of a carrier resin concentrate.

32. A process according to claim 28 in which the carrier resin is different than the thermoplastic resin.

33. A process according to claim 28 in which the carrier resin is different than the thermoplastic resin and is PET, a PET copolymer or PETG.

34. A process according to claim 29 in which the carrier resin is different than the thermoplastic resin.

35. A process according to claim 29 in which the carrier resin is different than the thermoplastic resin and is PET, a PET copolymer or PETG.

36. A process according to claim 30 in which the carrier resin is different than the thermoplastic resin.

37. A process according to claim 30 in which the carrier resin is different than the thermoplastic resin and is PET, a PET copolymer or PETG.

38. A process according to claim 31 in which the carrier resin is different than the thermoplastic resin.

39. A process according to claim 31 in which the carrier resin is different than the thermoplastic resin and is PET, a PET copolymer or PETG.

* * * * *